Figure 4:
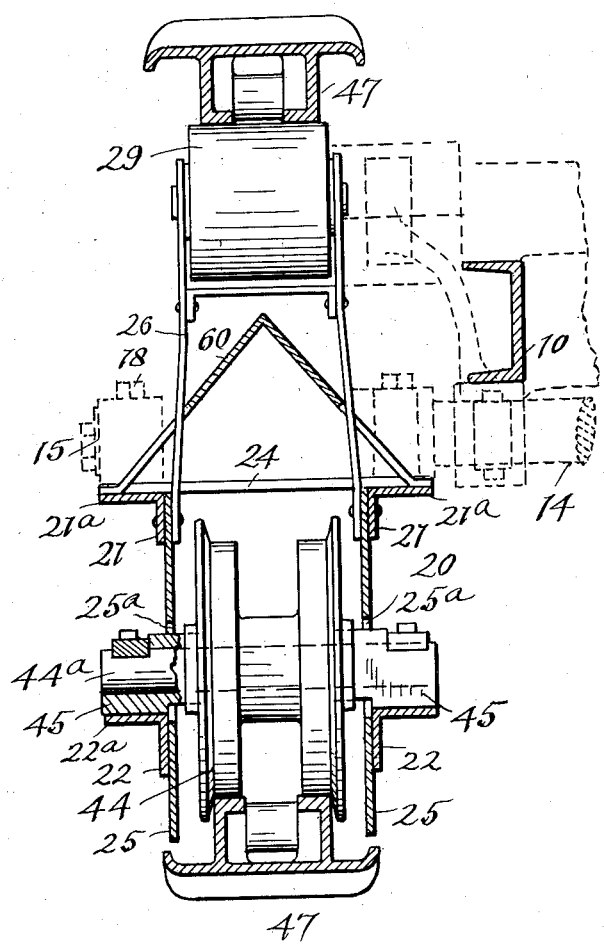

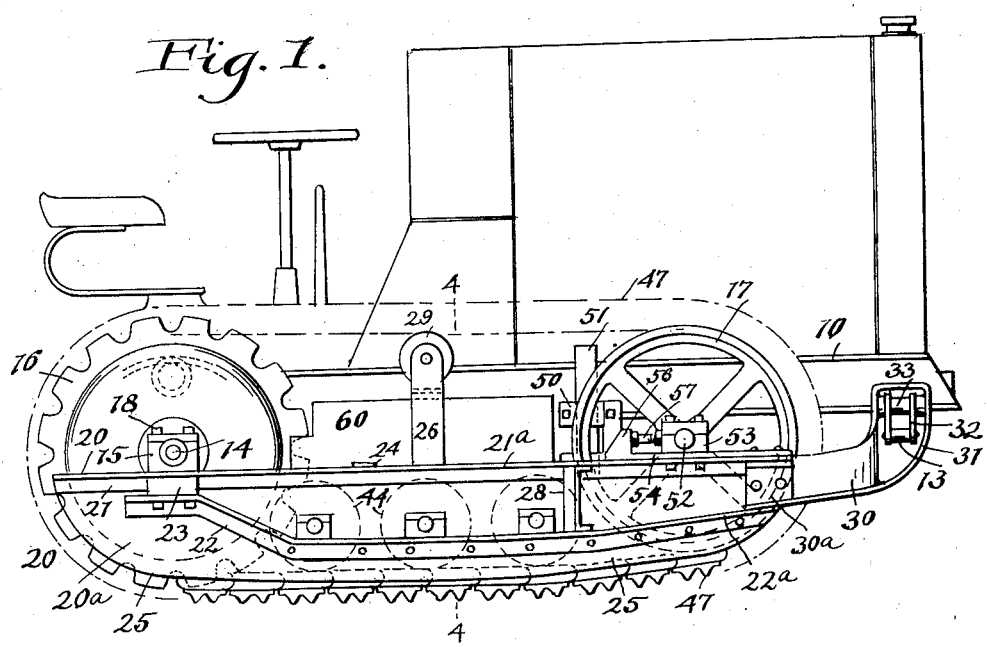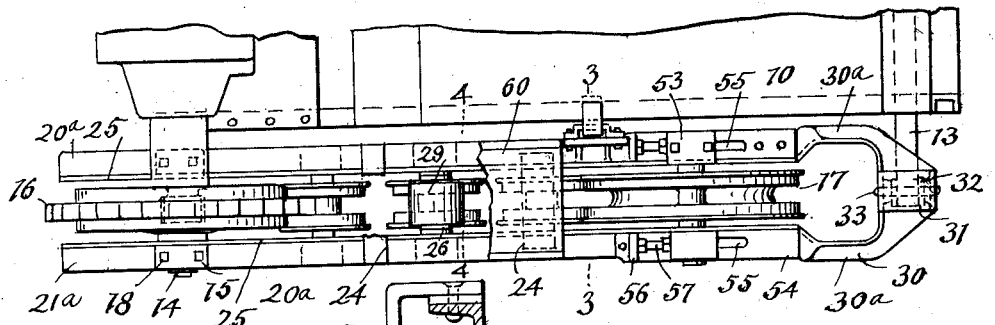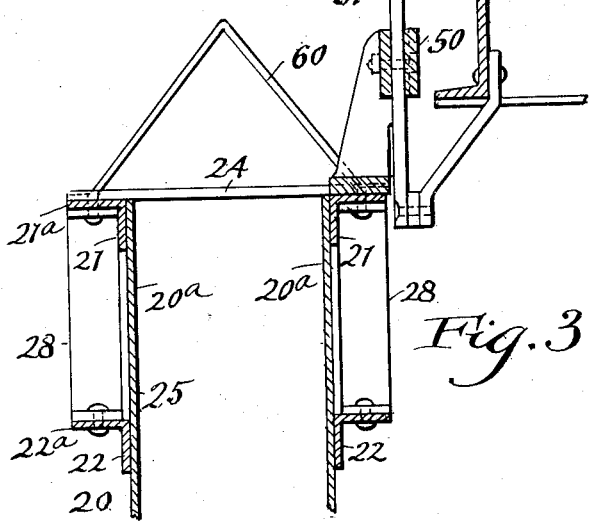

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACTION-FRAME CONSTRUCTION FOR TRACK-LAYING TRACTORS.

1,338,059.      Specification of Letters Patent.      Patented Apr. 27, 1920.

Application filed February 11, 1918, Serial No. 216,551. Renewed September 15, 1919. Serial No. 323,999.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Traction-Frame Construction for Track-Laying Tractors, of which the following is a full, clear, and exact description.

This invention relates to track laying tractors of the type which forms the subject matter of my Patent No. 1,253,319; and particularly to the construction of the two traction frames which respectively lie on opposite sides of the main frame, and are pivoted near their rear ends to said main frame on alined axes and are connected at their front ends to the ends of a rocking bar, which is preferably resilient, and which is pivoted at its middle to the main frame.

The object of the invention is to make said traction frames in such wise that they will be strong and durable, and especially adapted to be operatively connected as required with the main frame, and to permit the easy and economical attachment to said traction frames of the various parts required to be connected thereto; and generally, to insure the continued functioning of the various parts associated with said traction frame.

The invention consists in the construction and combination of parts shown in the drawings and hereinafter described and definitely pointed out in the appended claims.

In the drawings, Figure 1 is a side elevation of a track laying tractor in which the present invention is embodied; Fig. 2 is a plan view of a traction frame on one side of the machine and a part of the main frame adjacent thereto; Fig. 3 is a vertical transverse sectional view through the traction frame and an adjacent part of the main frame in the plane indicated by line 3—3 on Fig. 2; Fig. 4 is a vertical transverse sectional view in the plane of line 4—4 on Fig. 2.

Referring to the parts by reference characters, 10 represents the main frame, and 14 the nonrotatable axle which is fixed to the main frame near its rear end, and upon which the traction frames are mounted so that they may oscillate. 20 represents each traction frame as an entirety. There are two of these traction frames, located one on each side of the main frame. Each traction frame is composed of two vertical parallel built up beams $20^a$ which near their rear ends are hung on the axle 14, and at their front ends are connected by the yoke 30. A driving sprocket 16 is rotatably mounted upon the axle 14 on each side of the machine between the two beams constituting the traction frame. An idler wheel 17 is rotatably mounted between the two beams of each traction frame near the front end of said frame; and a linked track belt 47 goes around and engages the sprocket wheel 16 and the idler wheel 17.

13 represents an equalizer bar which, as shown in said prior patent, is in the form of a leaf spring, and is pivoted at its middle point to the main frame on a longitudinally extended horizontal axis, and which at its end is connected with the yokes 30 of the two traction frames.

To the extent specified, the tractor shown in the drawing hereof is generically like the tractor shown in the said prior application.

As stated, each traction frame 20 consists of two parallel built up vertically disposed beams $20^a$. These are alike; and each includes as its upper tension member a straight horizontal angle bar 21. It also includes an angle bar compression member 22 which is bent substantially as shown. One of the rearwardly extended arms $30^a$ of the yoke 30 is fitted between the flanges $21^a$ and $22^a$ of said angle bars, and is riveted to them. One of these yoke arms is connected as stated to angle bars of the outside beam, and the other yoke arm is similarly connected with the angle bars of the inside beam of the same traction frame.

Adjacent the rear ends of the angle bars 21, 22, a spacing block 23 is fitted between their flanges; and a journal box 15 is located upon the flange $21^a$ over this spacing block; and this journal box and the flanges $21^a$ and $22^a$ and the spacing block 23 are all rigidly secured together by bolts 18. It is through these journal boxes 15 that the rear ends of the two beams of each traction frame are hung so that they may oscillate upon the axle 14.

A vertical strut 28 is secured between the two angle bars 21 and 22, being riveted to the flanges of said bars. The two beams $20^a$ of each traction frame 20 are likewise connected at one or more points between the two wheels 16 and 17 by cross bars 24 secured by rivets to the flanges of the top angle bars 21.

An open A-shaped guard plate 60 extends between and is riveted to the flanges of the upper angle bars 21 of the two parallel beams 20ᵃ which constitute each traction frame 20; and this guard plate serves to prevent dirt, which may drop from the pockets of the links in the upper reach of the track belt 47, from dropping into the pockets of the links in the ground reach of said track belt.

Two bars 26 are respectively riveted to the two side beams of the traction frame, and extend upwardly therefrom; and a wheel 29 lies between and is mounted on a cross pin which is fixed to and extends between the upper ends of these two bars, whereby said wheel will engage and sustain the upper reach of the track belt.

Weight sustaining wheels 44 are located between the two beams of each traction frame, in a position to engage the ground reach of the traction chain, as shown in said prior patent. These wheels are rotatably mounted on shafts 44ᵃ and each of these shafts is mounted at its ends in boxes 45, one secured to each of the two beams of the traction frame. Each of these journal boxes rests upon and is bolted to the flange 22ᵃ of the lower compression angle bar of the beam.

A metal plate 25 is secured to the inner faces of the two beams 21, 22, and extends below the lower beam 22 far enough to lap past the upper parts of the track rails or link sides of the various links of the traction belt, so as to prevent or greatly minimize the entry of dirt into the pockets of the links of said track belts. This plate 25 extends practically to the periphery of the sprocket wheel as shown. In this plate are holes 25ᵃ for the passage of the shafts 44ᵃ. The plate is riveted to both angle bars 21, 22, to the strut 28, and to the arm 30ᵃ of the yoke 30; and therefore this plate adds considerably to the strength of each beam.

Each front yoke 30, which is a part of each traction frame, has at its front end an upwardly extended open sided loop 31. The resilient equalizer bar 13 at each end thereof projects into one of these loops, and is there connected with the loop by means of shackle links 32 hung on a pin 33 which extends forward and backward and is connected with the front and rear walls of said loop. The purpose of these loops is not merely to afford means for connecting the equalizer bar to the front end of the traction frame, but to protect from injury this connecting means so that in case the front end of one of these traction frames should come in contact with some obstruction, the relatively delicate connections between the yoke and bar 13 will not be injured.

Secured to the flange of the upper angle bar of the inside beam of each traction frame is a loop 50, and secured to the adjacent side beam of the main frame is a downwardly extended strap 51 which goes through said loop and aids in preventing any lateral movement of the associated traction frame relative to the main frame as said traction frame oscillates upon shaft 14 when the machine is in use.

The idler wheel 17 is fixed to a shaft 52 which is mounted in two journal boxes 53; each of these journal boxes is supported upon a plate 54 that rests upon and is bolted to the flange of each upper angle bar of each beam. Each plate has a longitudinally extended slat 55, and so has the flange upon which such a plate is secured. Bolts go through these journal boxes and through these slots, which are long enough to permit the longitudinal movement of the journal boxes to take up slack in the chain belt 13. Each plate 54 is formed at its rear end with an upturned arm 56 through which adjacent screws 57 which engage the journal box and with which said journal box may be moved rearward, are allowed to move forward as circumstances require. When it has come to the proper position the journal box is bolted down upon the plate and the plate upon the flange by the bolts.

Having described my invention, I claim:—

1. A traction frame for a track laying tractor comprising two built up parallel beams, each of which includes an angle bar forming the upper chord of said beam, an angle bar forming the lower chord of said beam, and a plate which spans the space between said angle bars and is riveted to both, combined with a yoke having two rearwardly extended arms which are respectively connected with the two beams each arm being fitted between and riveted to the front ends of the two angle bars of the associated beam.

2. A traction frame for a track laying tractor comprising two built up parallel beams each of which includes an angle bar forming the upper chord of said beam, a bent angle bar forming the lower chord of said beam, and a plate which spans the space between said angle bars and is riveted to both, combined with a yoke having two rearwardly extended arms which are respectively connected with the two beams,— each arm being fitted between and riveted to the front ends of the two angle bars of the associated beam and said yoke being formed at its front end with an upwardly extended open sided loop.

3. A traction frame for a track laying tractor comprising two built up parallel beams each of which includes an angle bar forming the upper chord of said beam, a bent angle bar forming the lower chord of said beam, and a plate which spans the space between said angle bars and is riveted to both, combined with a yoke having two rearwardly extended arms which are respectively connected with the two beams, each arm being fitted between and riveted to the front ends of the two angle bars of the associated beam, a spacing block interposed between the angle bars of each beam adjacent their rear ends, a journal box applied to the upper side of the flange of each upper angle bar, and bolts connecting together said journal boxes, spacing blocks and the flanges of said two angle bars.

4. A traction frame for a track laying tractor comprising two built up parallel beams each of which includes an angle bar forming the upper chord of said beam, a bent angle bar forming the lower chord of said beam, and a plate which spans the space between said angle bars and is riveted to both, combined with a yoke having two rearwardly extended arms which are respectively connected with the two beams,— each arm being fitted between and riveted to the front ends of the two angle bars of the associated beam, a spacing block interposed between the angle bars of each beam adjacent their rear ends, a journal box applied to the upper side of the flange of each upper angle bar, and bolts connecting together said journal boxes, spacing blocks and the flanges of said two angle bars, boxes secured upon the flanges of the lower angle bars of the two beams, transversely extended shafts supported in the last named boxes, and weight supporting rollers upon said shafts.

5. A traction frame for a track laying tractor comprising two built up parallel beams each of which includes an angle bar forming the upper chord of said beam, a bent angle bar forming the lower chord of said beam, and a plate which spans the space between said angle bars and is riveted to both, combined with a yoke having two rearwardly extended arms which are respectively connected with the two beams each arm being fitted between and riveted to the front end of the two angle bars of the associated beam, means connecting the rear ends of said angle bars, an open A-plate which extends between and is riveted to the flanges of the two upper angle bars of the two beams.

6. A traction frame for a track laying tractor comprising two built up parallel beams each of which includes an angle bar forming the upper chord of said beam, a bent angle bar forming the lower chord of said beams, and a plate which spans the space between said angle bars and is riveted to both, combined with a yoke having two rearwardly extended arms which are respectively connected with the two beams each arm being fitted between and riveted to the front end of the two angle bars of the associated beam, means connecting the rear ends of said angle bars, two bars fixed respectively to the flanges of the upper angle bars of the two beams and extending upward therefrom, and a track belt supporting wheel mounted in the upper ends of said bars.

7. In a track laying tractor, the combination of a main frame, a nonrotating axle fixed to and extending transversely with respect to said main frame, and a tractor frame hung upon each end of said axle, said traction frame comprising in combination two beams, a yoke connecting their front ends, a journal box fixed to each beam and embracing the axle, a driving sprocket mounted upon said axle between the two beams of each traction frame, and an idler wheel mounted between the two beams of each traction frame,—said idler wheel being secured to a shaft, journal boxes in which each shaft is mounted, a plate secured to each beam of each traction frame having an upturned rear end said journal boxes resting upon said plates, and an adjustment screw associated with each journal box which screws through the upturned rear end of the upturned plate and bears against the journal box.

8. A traction frame for a track laying tractor comprising two built up parallel beams each of which includes an angle bar forming the upper chord of said beam, a bent angle bar forming the lower chord of said beam, and a plate which spans the space between said angle bars and is riveted to both and extends below the lower angle bar, a yoke having two rearwardly extended arms which are respectively connected with the two beams each arm being fitted between and riveted to the front ends of the angle bar of the associated beam, boxes fixed upon the horizontal flanges of the angle bars of the two beams, shafts supported in said boxes, and track laying rollers rotatably mounted upon said shafts between the two beams,—the said plates which are parts of the beams having holes through which said shafts may pass.

In testimony whereof, I hereunto affix my signature.

ROLLIN H. WHITE.